United States Patent
Thompson, III et al.

(10) Patent No.: US 12,476,915 B2
(45) Date of Patent: *Nov. 18, 2025

(54) REDUCING NETWORK TRAFFIC BY FILTERING NETWORK REQUESTS BASED ON NETWORK REQUEST-RELATED INFORMATION SYSTEMS AND METHODS

(71) Applicant: Citibank, N.A., New York, NY (US)

(72) Inventors: Richard Harte Thompson, III, New York, NY (US); Rohit Mathur, New York, NY (US)

(73) Assignee: CITIBANK, N.A., NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/787,837

(22) Filed: Jul. 29, 2024

(65) Prior Publication Data
US 2024/0388534 A1    Nov. 21, 2024

Related U.S. Application Data

(63) Continuation of application No. 18/473,173, filed on Sep. 22, 2023, now Pat. No. 12,052,174, which is a
(Continued)

(51) Int. Cl.
*H04L 47/12* (2022.01)
*H04L 9/40* (2022.01)
(Continued)

(52) U.S. Cl.
CPC .......... *H04L 47/12* (2013.01); *H04L 47/122* (2013.01); *H04L 47/80* (2013.01); *H04L 63/102* (2013.01); *H04L 47/127* (2013.01)

(58) Field of Classification Search
CPC ........ H04L 47/12; H04L 47/80; H04L 47/111; H04L 47/125; H04L 47/127; H04L 47/129; H04L 63/102
(Continued)

(56) References Cited

U.S. PATENT DOCUMENTS 6,934,249 B1    8/2005 Bertin et al.
8,781,882 B1 *  7/2014 Arboletti ............ G06Q 10/0639
                                                      705/7.41
(Continued)

FOREIGN PATENT DOCUMENTS

CA    3049468 A1    8/2018
CA    3053957 A1    8/2018
(Continued)

OTHER PUBLICATIONS

International Search Report and Written Opinion received in Application No. PCT/US24/29757, dated Aug. 28, 2024, 17 pages.

*Primary Examiner* — Khanh Q Dinh
(74) *Attorney, Agent, or Firm* — Perkins Coie LLP

(57) ABSTRACT

Systems and methods for reducing network traffic by filtering network requests based on network request-related information to be transmitted to one or more remote computing systems are disclosed. The system receives a first network operation indicating (i) a request to access a first resource and (ii) a set of requestor specific criteria associated with accessing the first resource. The system identifies a set of entities associated with the first resource and selectively communicates with a filtered subset of the set of entities by: identifying a set of entity specific criteria for each entity of the set of entities; determining whether the requestor specific criteria satisfies the set of entity specific criteria of respective entities; and transmitting the first network operation to respective entities in response to the requestor specific criteria satisfying the set of entity specific criteria of the respective entity.

18 Claims, 8 Drawing Sheets

Related U.S. Application Data continuation of application No. 18/318,685, filed on May 16, 2023, now Pat. No. 11,792,125.

(51) Int. Cl.
  *H04L 47/122* (2022.01)
  *H04L 47/80* (2022.01)
  *H04L 47/127* (2022.01)

(58) Field of Classification Search
  USPC .......................................... 709/220, 224–228
  See application file for complete search history.

(56) References Cited

U.S. PATENT DOCUMENTS

| | | | |
|---|---|---|---|
| 9,419,908 B2* | 8/2016 | Kulkarni | H04L 47/125 |
| 10,038,711 B1 | 7/2018 | Gorodissky et al. | |
| 10,068,095 B1 | 9/2018 | Segal et al. | |
| 10,474,563 B1 | 11/2019 | Rai et al. | |
| 10,650,032 B1 | 5/2020 | Laurence et al. | |
| 10,664,508 B1 | 5/2020 | Laurence et al. | |
| 10,803,197 B1 | 10/2020 | Liao et al. | |
| 11,082,487 B1 | 8/2021 | Jain et al. | |
| 11,526,502 B1 | 12/2022 | Harris et al. | |
| 11,722,554 B2 | 8/2023 | Keren et al. | |
| 11,792,125 B1 | 10/2023 | Thompson, III et al. | |
| 12,244,583 B1* | 3/2025 | Kurani | H04L 63/102 |
| 2009/0254971 A1* | 10/2009 | Herz | G06Q 10/10 726/1 |
| 2010/0017516 A1* | 1/2010 | Sparrell | H04N 21/234336 706/46 |
| 2013/0021933 A1* | 1/2013 | Kovvali | H04W 88/18 370/252 |
| 2013/0073473 A1 | 3/2013 | Heath | |
| 2013/0097664 A1* | 4/2013 | Herz | G06Q 30/02 726/1 |
| 2014/0107954 A1* | 4/2014 | Lih | G01N 29/50 702/54 |
| 2015/0146526 A1* | 5/2015 | Kulkarni | H04L 47/122 370/230.1 |
| 2016/0002635 A1 | 1/2016 | Wilton et al. | |
| 2018/0357105 A1 | 12/2018 | Rishabh et al. | |
| 2019/0245883 A1 | 8/2019 | Gorodissky et al. | |
| 2019/0306052 A1* | 10/2019 | Cheng | H04L 45/123 |
| 2020/0195652 A1 | 6/2020 | Carnahan et al. | |
| 2020/0280577 A1 | 9/2020 | Segal et al. | |
| 2021/0216893 A1 | 7/2021 | Roden et al. | |
| 2021/0314341 A1 | 10/2021 | Moskovich et al. | |
| 2021/0326458 A1 | 10/2021 | Watson et al. | |
| 2022/0150125 A1 | 5/2022 | Kumar et al. | |

FOREIGN PATENT DOCUMENTS

| | | |
|---|---|---|
| CA | 3061638 A1 | 11/2018 |
| CA | 3065807 A1 | 12/2018 |

* cited by examiner

500

|  | | Sign In | Contact Us |

Details  502e  502f  502g

|  | 2021 | 2020 | 2019 |
| Revenue: | 3,005,510 | 1,258,712 | 1,750,329 |
| Net Income: | 755,542 | 72,055 | 625,041 |

502g

Please add commentary that you want lenders to know about your performance:

Please provide balances from most recent fiscal year

Total assets at year-end 2021:    Total net worth at year-end 2021:

750,282    520,488

502h   Do you have an outstanding order?    502j    502i

Please Select ▽

| | Sign In | Contact Us |

Additional Details ─ 504

Please upload bank statements: [Doc1.pdf] ─ 506a

Please upload affiliation documents: [Doc2.pdf] ─ 506b

─ 506c  ─ 506d

Personal Guarantee

Estimated personal net worth:   Estimated personal annual income:

[750,000]   [100,000]

Are you open to providing a personal guarantee?

○ Yes  ─ 506e
○ Yes, if needed, but I'd rather not.
○ No
○ I'm not sure.

REDUCING NETWORK TRAFFIC BY FILTERING NETWORK REQUESTS BASED ON NETWORK REQUEST-RELATED INFORMATION SYSTEMS AND METHODS

CROSS-REFERENCE TO RELATED APPLICATION(S)

This application is a continuation of U.S. patent application Ser. No. 18/473,173 entitled "REDUCING NETWORK TRAFFIC BY FILTERING NETWORK REQUESTS BASED ON NETWORK REQUEST-RELATED INFORMATION SYSTEMS AND METHODS" filed Sep. 22, 2023, which is a continuation of U.S. patent application Ser. No. 18/318,685 entitled "REDUCING NETWORK TRAFFIC BY FILTERING NETWORK REQUESTS BASED ON NETWORK REQUEST-RELATED INFORMATION SYSTEMS AND METHODS" filed May 16, 2023. The entire disclosure of each of these applications is incorporated herein by reference.

BACKGROUND

As access to the Internet has increased in recent times, so have the amount of network requests transmitted over the Internet. For instance, as billions of users browse the internet daily searching for content, an increased amount of network traffic causing high latency network latency is experienced. Not only does this issue impact end users searching for personal content, but also impacts industries as they rely so heavily on internet communications to provide essential information across various computing networks. In the context of computing networking, Internet Protocol (IP) routers route information to one computing system (e.g., a user device) to another computing system (e.g., a hosting server) without regard as to whether the other computing system will accept/deny the information. This further increases the amount of network traffic and high network latency experienced across Internet communication systems as denied or failed operations are relayed back from a hosting server, through the router, and back to the client system, utilizing precious bandwidth and causing a poor user experience. These and other drawbacks exist.

BRIEF DESCRIPTION OF THE DRAWINGS

FIGS. 5A-5D shows an illustrative representation of a Graphical User Interface (GUI) associated with reducing network traffic by filtering network requests based on network request-related information, in accordance with some implementations of the present technology.

Figure 1:
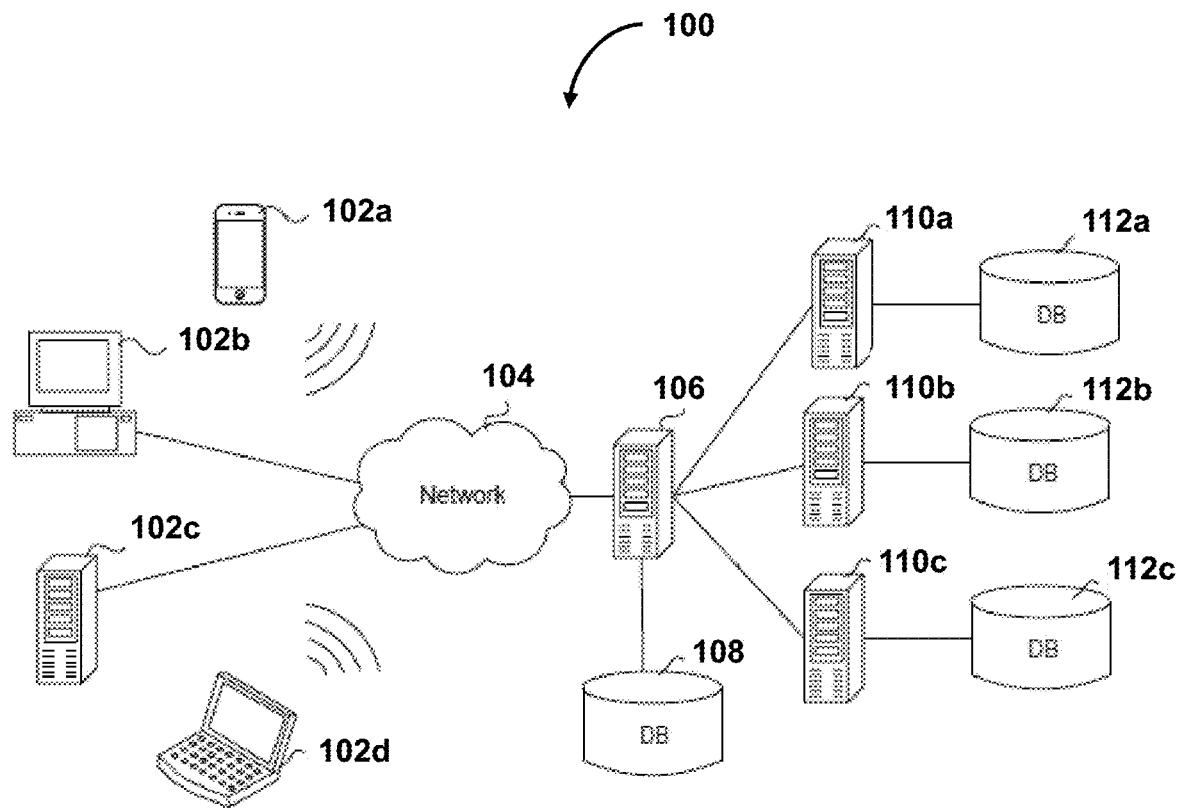
FIG. 1 is a system diagram illustrating an example of a computing environment in which the disclosed system operates in some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Daily, a large number of users exchange vast amounts of information over computing networks (such as, the Internet, Local Area Networks (LAN), Personal Area Networks (PAN), Metropolitan Area Networks (MAN), Wide Area Networks (WAN), Virtual Private Network (VPN), and the like), resulting in an increased amount of congestion issues. As the amount of users increase, a directly proportional relationship to network latency is experienced by transmitting a large amount of network operations, causing not only a poor user experience when accessing content over such networks, but also an increased chance for network operations to result in an error as existing content routing systems have no mechanism to vet network operations prior to transmitting such in real time (or near-real time).

For example, in the context of existing content routing systems, such as IP routers, may route network requests from a requestor (e.g., a requesting computing device, a requesting computing system) to a destination (e.g., a remote computing device, a remote computing system). Such content routing systems may enable computing devices/systems to communicate with one another by identifying one or more addresses associated with each computing system (e.g., an IP address) and transmitting network requests or other network operations between the respective computing systems. However, these existing content routing systems currently have no mechanism to ensure that a given network request (or network operation) conforms to requirements of the receiving destination (or that of the requesting device/system). For example, where a user would like to access content available via a remote computing system, the user may provide their user credentials (e.g., username and password) which may be included in a network operation, and subsequently transmit the network operation to the remote computing system from the users computing system. When the user forgets to provide the username or password (e.g., not conforming to the requirements of the remote computing system), the remote computing system may attempt to process the network operation. As there is a missing username or password, the remote computing system may return an error back to the user's computing system. Not only does this result in a waste of computer processing and memory resources, but also increases the amount of network traffic experienced over computing networks.

As another example, a user may attempt to view content available via the remote computing system that may be in an unsupported format. For instance, the user's computing system (e.g., computing device) may only enable the viewing of content that is in a particular format (e.g., .mpeg4, .pdf, .m4a, .mov, etc.) and the remote computing system hosting the content may be in a different, unsupported format. When the user attempts to access such content from the remote computing system, the user's computing system may be unable to process the retrieved content. This may cause the user to continually transmit requests to obtain such content, not understanding that the content cannot properly load on the user's computing system, leading to a poor user experience and unnecessary network traffic caused by the series of improper network operations. Thus, without a mechanism to properly vet whether a network request is valid prior to transmitting the network request, a large amount of computer processing, computer memory, and valuable network bandwidth may be wasted, causing a poor user experience.

Thus, in light of these and other problems with existing solutions and systems, there is a need for reducing the amount of network traffic over computing networks. There is a further need to vet network operations before they are ultimately relayed to an intended receiving computing device. Moreover, there is a need to selectively communicate with intended receiving computing devices based on the given network operation.

The inventors have developed a system for reducing network traffic by filtering network requested based on network request-related information to be transmitted to one or more remote computing systems. For instance, the inventors have developed a network traffic reduction system that identifies entities associated with accessing a given resource, and selectively communicating with a subset of entities that (i) provide access to the given resource and (ii) may fulfil network operation specific criteria associated with a network operation. For example, by first identifying a set of entities to which provide access to a first resource, the system may use a baseline of entities to which the network request may be transmitted to. The system may then selectively communicate with a subset of entities by (i) identifying for each entity of the set of entities, entity specific criteria indicating requirements of the respective entity and (ii) determining whether requestor specific criteria indicating requirements of the respective requestor satisfies the entity specific criteria. When the requestor specific criteria satisfied the entity specific criteria, the network operation may be transmitted to a remote computing system associated with the respective entity. In this way, the system may vet network request prior to transmitting the network request to the remote computing systems to ensure that the entity/respective remote computing system may fulfil the network operation without the need to transmit a denial/failure message back to the requestor. By doing so, the system reduced the amount of network traffic experienced over computing networks as such requests may only be transmitted (i) to a select amount of entities/computing systems and (ii) when the network operation will be fulfilled or accepted by the respective entities/computing systems.

In various implementations, the methods and systems described herein can reduce network traffic by filtering network requests based on network request-related information to be transmitted to one or more remote computing systems. For example, the system can receive, from a first remote computing system, a first network operation indicating (i) a request to access a first resource and (ii) a set of requestor specific criteria associated with accessing the first resource. The system can identify a set of entities associated with the first resource using the request to access the first resource, where each entity of the set of entities provides access to the first resource. The system can selectively communicate with a filtered subset of entities of the set of entities by: identifying a set of entity specific criteria for each entity of the set of entities associated with accessing the first resource; determining, for each entity of the set of entities, whether the set of requestor specific criteria associated with accessing the first resource satisfies the set of entity specific criteria of a respective entity of the set of entities; and in response to the set of requestor specific criteria satisfying the set of entity specific criteria of the respective entity, transmitting the first network operation to a second remote computing system associated with the respective entity.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

Figure 2:
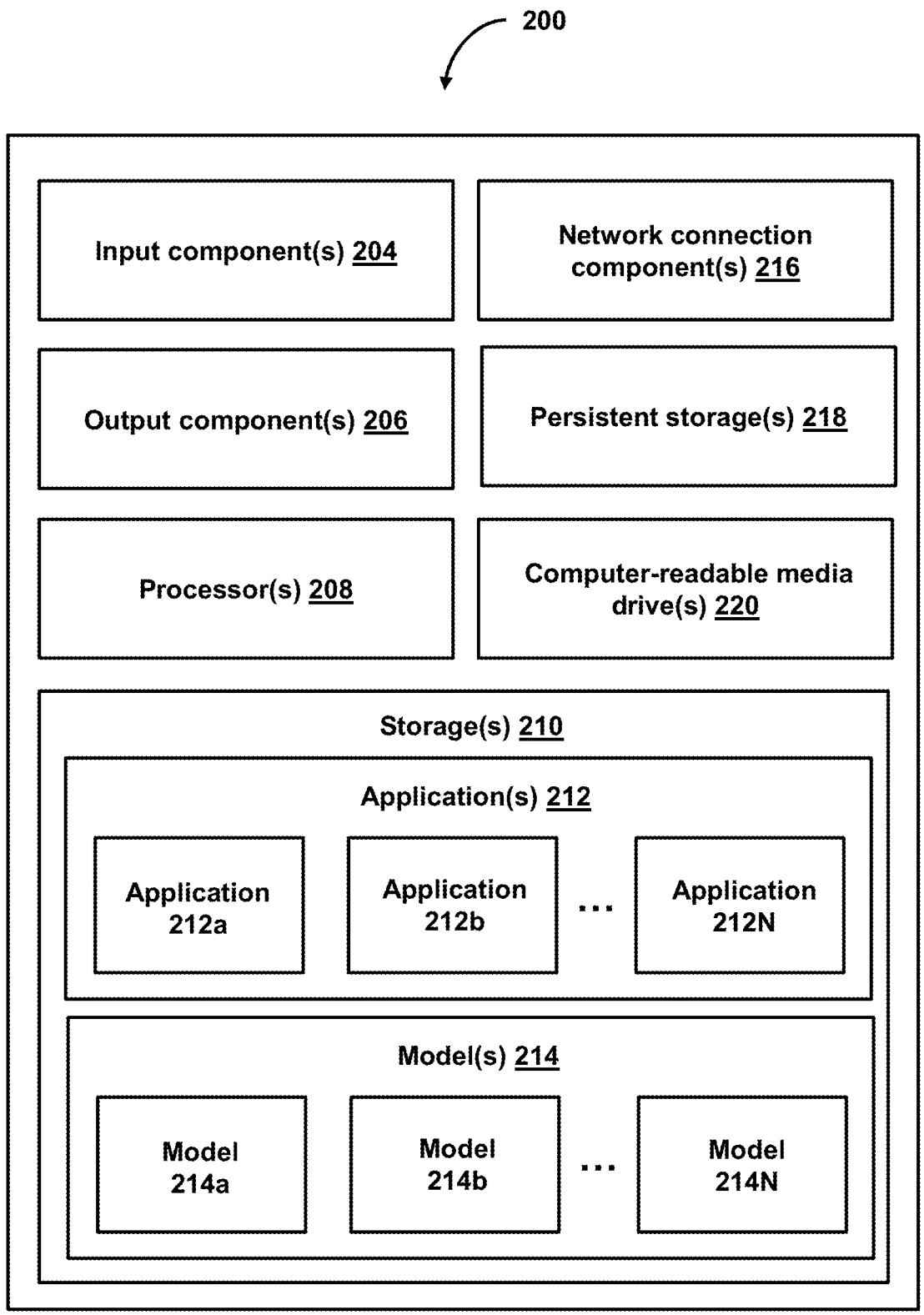
FIG. 2 is a block diagram showing some of the components typically incorporated in at least some of the computer systems and other devices on which the disclosed system operates in accordance with some implementations of the present technology.

FIG. 1 is a system diagram illustrating an example of a computing environment in which the disclosed system operates in some implementations. In some implementations, environment 100 includes one or more client computing devices 102*a-d*, examples of which can host the system (or other system components). For example, the computing devices 102*a-d* can comprise distributed entities a-d, respectively. Client computing devices 102 operate in a networked environment using logical connections through network 104 to one or more remote computers, such as a server computing device. In some implementations, client computing devices 102 may correspond to device 200 (FIG. 2).

In some implementations, server computing device 106 is an edge server which receives client requests and coordinates fulfillment of those requests through other servers, such as servers 110*a-c*. In some implementations, server computing devices 106 and 110 comprise computing systems. Though each server computing device 106 and 110 is displayed logically as a single server, server computing devices can each be a distributed computing environment encompassing multiple computing devices located at the same or at geographically disparate physical locations. In some implementations, each server computing device 110 corresponds to a group of servers.

Client computing devices 102 and server computing devices 106 and 110 can each act as a server or client to other server or client devices. In some implementations, server computing devices (106, 110*a-c*) connect to a corresponding database (108, 112*a-c*). As discussed above, each server computing device 110 can correspond to a group of servers, and each of these servers can share a database or can have its own database. Databases 108 and 112 warehouse (e.g., store) information such as, predefined ranges, predefined thresholds, error thresholds, historical information (e.g., network operations, request to access resources, values associated with accessing resources, threshold values associated with accessing resources, requestor specific criteria, entity specific criteria, response information, requests for additional requestor specific criteria, requestor identifiers, entity identifiers), second sets of entity specific criteria, threshold values associated with accessing resources, machine learning models, training data for machine learning models, remote computing system identifiers (e.g., Internet Protocol (IP) address, Universal Resource Locator (URL), Universal Resource Identifier (URI)), mathematical formulas (e.g., weighted average, weighted sum, or other mathematical formulas), graphical elements (e.g., colors, shapes, text, images, multimedia), or other information.

Though databases 108 and 112 are displayed logically as single units, databases 108 and 112 can each be a distributed computing environment encompassing multiple computing devices, can be located within their corresponding server, or can be located at the same or at geographically disparate physical locations.

Network 104 can be a local area network (LAN) or a wide area network (WAN) but can also be other wired or wireless networks. In some implementations, network 104 is the Internet or some other public or private network. Client computing devices 102 are connected to network 104 through a network interface, such as by wired or wireless communication. While the connections between server computing device 106 and server computing device 110 are shown as separate connections, these connections can be any kind of local, wide area, wired, or wireless network, including network 104 or a separate public or private network.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212 (e.g., applications 212a, 212b, . . . , 212n), model(s) 214 (e.g., models 214a, 214b, . . . , 214n), and other programs and data while they are being used, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the system, those skilled in the art will appreciate that the system may be implemented using devices of various types and configurations, and having various components.

Machine Learning Model(s)

Figure 3:
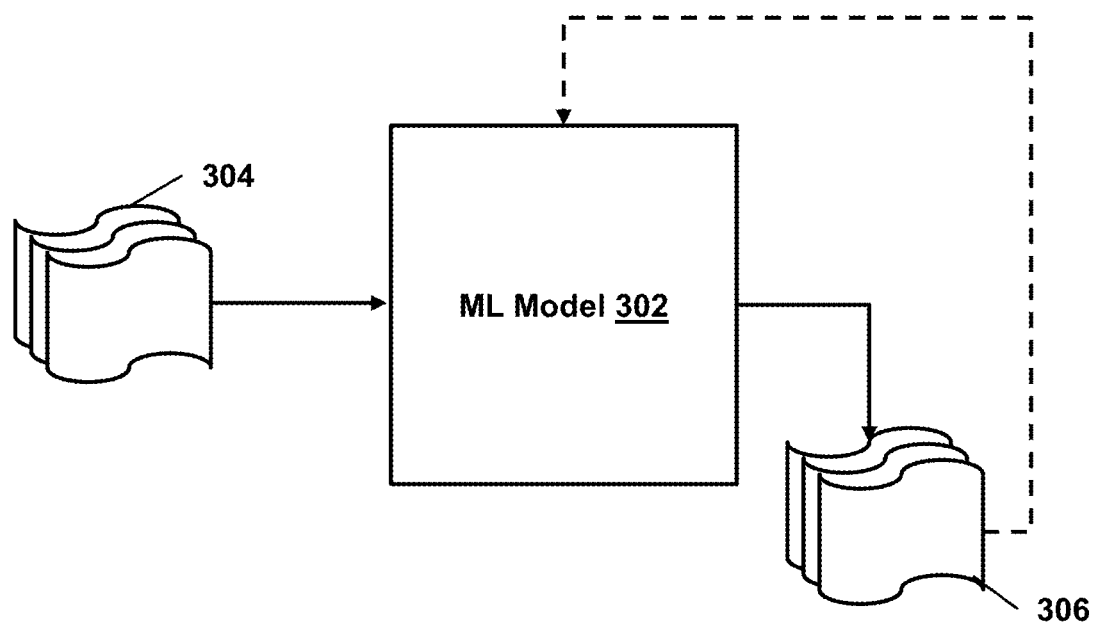
FIG. 3 is an illustrative diagram illustrating a machine learning model, in accordance with some implementations of the present technology.

FIG. 3 is a block diagram illustrating a machine learning model, in accordance with some implementations of the present technology. The machine learning model 302 can be part of, or work in conjunction with server computing device 106 (FIG. 1). For example, server computing device 106 can store a computer program that uses information obtained from machine learning model 302, provide information to machine learning model 302, or communicate with machine learning model 302. In other implementations, machine learning model 302 may be stored in database 108 and may be retrieved by server computing device 106 to execute/process information related to machine learning model 302.

In some implementations, the machine learning model 302 includes one or more neural networks or other machine learning models. Neural networks are based on a large collection of neural units (or artificial neurons). Neural networks loosely mimic the manner in which a biological brain works (e.g., via large clusters of biological neurons connected by axons). Each neural unit of a neural network is connected with many other neural units of the neural network. Such connections can be enforcing or inhibitory in their effect on the activation state of connected neural units. In some implementations, each individual neural unit has a summation function which combines the values of all its inputs together. In some implementations, each connection (or the neural unit itself) has a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks include multiple layers (e.g., where a signal path traverses from front layers to back layers). In some implementations, back propagation techniques are utilized by the neural networks, where forward stimulation is used to reset weights on the "front" neural units. In some implementations, stimulation and inhibition for neural networks are more free-flowing, with connections interacting in a more chaotic and complex fashion.

As an example, with respect to FIG. 3, machine learning model 302 takes inputs 304 and provide outputs 306. Outputs 306 can be fed back to machine learning model 302 as input to train machine learning model 302 (e.g., alone or in conjunction with user indications of the accuracy of outputs 306, labels associated with the inputs, or with other reference feedback information). Alternatively/additionally, machine learning model 302 updates its configurations (e.g., weights, biases, or other parameters) based on its assessment of its prediction (e.g., outputs 306) and reference feedback information (e.g., user indication of accuracy, reference labels, or other information). Where the machine learning model 302 is a neural network, connection weights can be adjusted to reconcile differences between the neural network's prediction and the reference feedback. One or more neurons (or nodes) of the neural network can require that their respective errors are sent backward through the neural network to them to facilitate the update process (e.g., backpropagation of error). Updates to the connection weights can for example, be reflective of the magnitude of error propagated backward after a forward pass has been completed. In this way, for example, the machine learning model 302 is be trained to generate better predictions.

The neural network can include one or more input layers, hidden layers, and output layers. Each layer may include one or more nodes that are interconnected with each other via links. The number of the links may correspond to the number of the nodes included in the subsequent layers with respect to a given layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections/connection weights. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 302 can be trained based on information stored in database 108 to generate predictions related to whether requestor specific criteria, requestor specific information, or other network operation-related information satisfies criteria related accessing a resource. For example, database 108 may include information such as historical requests to access a given resource, historical user specific information, historical criteria associated with accessing a first resource, historical entity specific criteria, historical outcomes, or other information. Each historical request, user specific information, criteria associated with accessing a resource, and entity specific criteria may be associated with a given outcome (e.g., related to whether the request satisfied entity specific criteria) to train the machine learning model 302 using a supervised-learning technique. However, in some implementations, machine learning model 302 may be trained using an unsupervised-learning technique.

For example, machine learning model 302 takes a first set of information as input 304. The first set of information includes historical requests, user specific information, criteria associated with accessing a resource, entity specific criteria, or other information. For example, in the context of loan application platforms, the historical requests can indicate a loan request. The user specific information can indicate financial information associated with the user (e.g., loan requestor, loan applicant) and can include financial information such as a supplier identifier (identifying the loan applicant/supplier), historical performance information (e.g., credit score, revenue, performance metrics), purpose of the loan (e.g., indicating what the loan is for, how the loan will be used, etc.), a type of loan (e.g., personal loan, business line of credit, equipment financing, bridge loans, inventory financing, Small Business Loan, etc.), an amount/value of the loan requested, a preferred location of lender (e.g., a geographic location), an indication as to whether the loan applicant wishes to hide/blacklist a given lender, or other requestor/user specific information. The entity specific criteria can include one or more preferences or inquiries that a given lender may have related to loan requests such as a minimum requirement for length of a loan applicant being in business, a minimum/maximum loan amount requirement, requirements for historical performance information (e.g., credit score, revenue, industry performance metrics), identity of the loan applicant requirements, loan type requirements, loan applicant location requirements, or other entity specific criteria. The criteria associated with accessing the resource (e.g., associated with securing a loan) can additionally include a minimum/maximum loan amount, a geographic location, a loan type, the entity specific criteria, historical performance information, purpose of the loan, length of loan applicant being in business, or other criteria that is specific to the loan being requested.

Machine learning model 302 takes the first set of information as input 304 and generates an output 306 indicating whether the requestor specific information (e.g., the user specific information) satisfies the criteria related to the condition(s) associated with accessing the resource. For instance, machine learning model 302 can learn relationships between the information included the requestor/user specific information and the criteria associated with securing the loan using (i) the loan application, (ii) the user specific information (e.g., the requestor specific information), and (ii) the criteria associated with securing the loan. In some implementations, the output 306 may be fed back into machine learning model 302 to update one or more configurations (e.g., weights, biases, or other parameters) based on its assessment of its prediction (e.g., outputs 306) and reference feedback information (e.g., user indication of accuracy, reference labeled, ground truth information, or other information). Output 306 may indicate a qualitative output such as "yes," "no," "high," "medium," "low," or other qualitative output. Additionally/alternatively, output 306 may indicate a quantitative output such as 100%, 1.0, 0, 1, 55, or other numerical (e.g., percentage, ratio, decimal, integer, hexadecimal) value indicating whether the user specific information associated with a first network operation satisfies a set of criteria related to accessing a resource.

In some implementations, machine learning model 302 can be trained based on information stored in database 108 to generate predictions related to whether requestor specific criteria associated with accessing a resource satisfies a set of entity specific criteria. For example, in the context of loan application platforms, machine learning model 302 can be trained to determine whether a given loan applicant satisfies requirements of a lender (e.g., bank, loan service provider, etc.). To reduce the amount of network traffic conventionally associated with spamming a plethora of lenders while impacting a loan applicant's credit score, the system can selectively communicate with a subset of lenders to which the loan application satisfies lender requirements based on a high likelihood that the loan applicant can secure the requested loan. As such, machine learning model 302 is trained to generate predictions related to whether requestor specific criteria associated with accessing a resource satisfies a set of entity specific criteria.

Thus, machine learning model 302 takes a second set of information as input 304. The second set of information includes requestor specific criteria and entity specific criteria. Machine learning model 302 takes the second set of information as input 304 and generates an output 306. The output can indicate whether the requestor specific criteria satisfies the entity specific criteria. For instance, the output may be a qualitative indication of "yes," "no," "high," "medium," "low," or other qualitative output. Additionally/alternatively, output 306 may indicate a quantitative output such as 100%, 1.0, 0, 1, 55, or other numerical (e.g., percentage, ratio, decimal, integer, hexadecimal) value indicating whether the requestor specific criteria satisfies the entity specific criteria. In this way, the system may determine a subset of entities to selectively communicate with that conform to the requestor specific criteria with respect to the entity specific criteria, thereby reducing the amount of network traffic. In some implementations, outputs 306 may be fed back into machine learning model 302 to update one or more configurations (e.g., weights, biases, or other parameters) based on its assessment of its prediction (e.g., outputs 306) and reference feedback information (e.g., user indication of accuracy, reference labels, ground truth information, or other information).

In some implementations, machine learning model 302 can be retrained when a performance of the machine learning model 302 fails to satisfy a performance threshold condition. For example, to ensure that machine learning model 302 generates the most accurate predictions (e.g., outputs), the machine learning model may be retrained on (i) a larger set of training data (e.g., the first or second set of information) to decrease estimation variance and hence, cause better predictive performance, (ii) a smaller set of training data (e.g., the first or second set of information) to decrease the effect of training data noise and reduce overfitting, or (iii) training data (e.g., the first or second set of information) that is within a predetermined time range.

During a training routine of machine learning model 302, one or more performance metrics may be measured to determine the accuracy of the predictions of machine learning model 302. Such performance metrics may be regression metrics (e.g., Mean Absolute Error (MAE), Mean Squared Error (MSE), Root Mean Squared Error (RMSE), Root Squared (R-Squared), classification metrics (e.g., accuracy, confusion matrix, precision and recall, F1-score, Area Under Receiver Operating Characteristics Curve (AU-ROC)), or other performance metrics. Database 108 (FIG. 1) can store performance threshold condition(s) with respect to each of regression or classification metrics which may be predetermined performance threshold conditions. As the machine learning model 302 generates predictions, the system may measure such performance metrics and compare the result value (e.g., the performance of machine learning model 302) to the respective performance threshold condition. When a performance of machine learning model 302 fails to satisfy the performance threshold condition (e.g., fails to meet or exceed the performance threshold condition, meets or exceeds the performance threshold condition, outside of a performance threshold condition range, etc.), the system may retrain machine learning model 302.

As an example, where machine learning model 302 is determined to have a performance metric of MAE that meets or exceeds a corresponding performance threshold condition (e.g., with respect to MAE), the system retrains machine learning model 302 on an expanded/larger set of training data to reduce the error. As another example, where machine learning model is determined to have a performance metric of classification accuracy that fails to meet or exceed a corresponding performance threshold condition (e.g., with respect to classification accuracy), the system retrains machine learning model 302 on a smaller set of training data to decrease the effect of training data noise and reduce overfitting (e.g., to increase the classification accuracy of machine learning model 302). In some implementations, training/retraining of machine learning model 302 can be performed iteratively until the performance metric satisfies a respective performance threshold condition.

Filtering Network Requests Based on Network Request-Related Information

Figure 4:
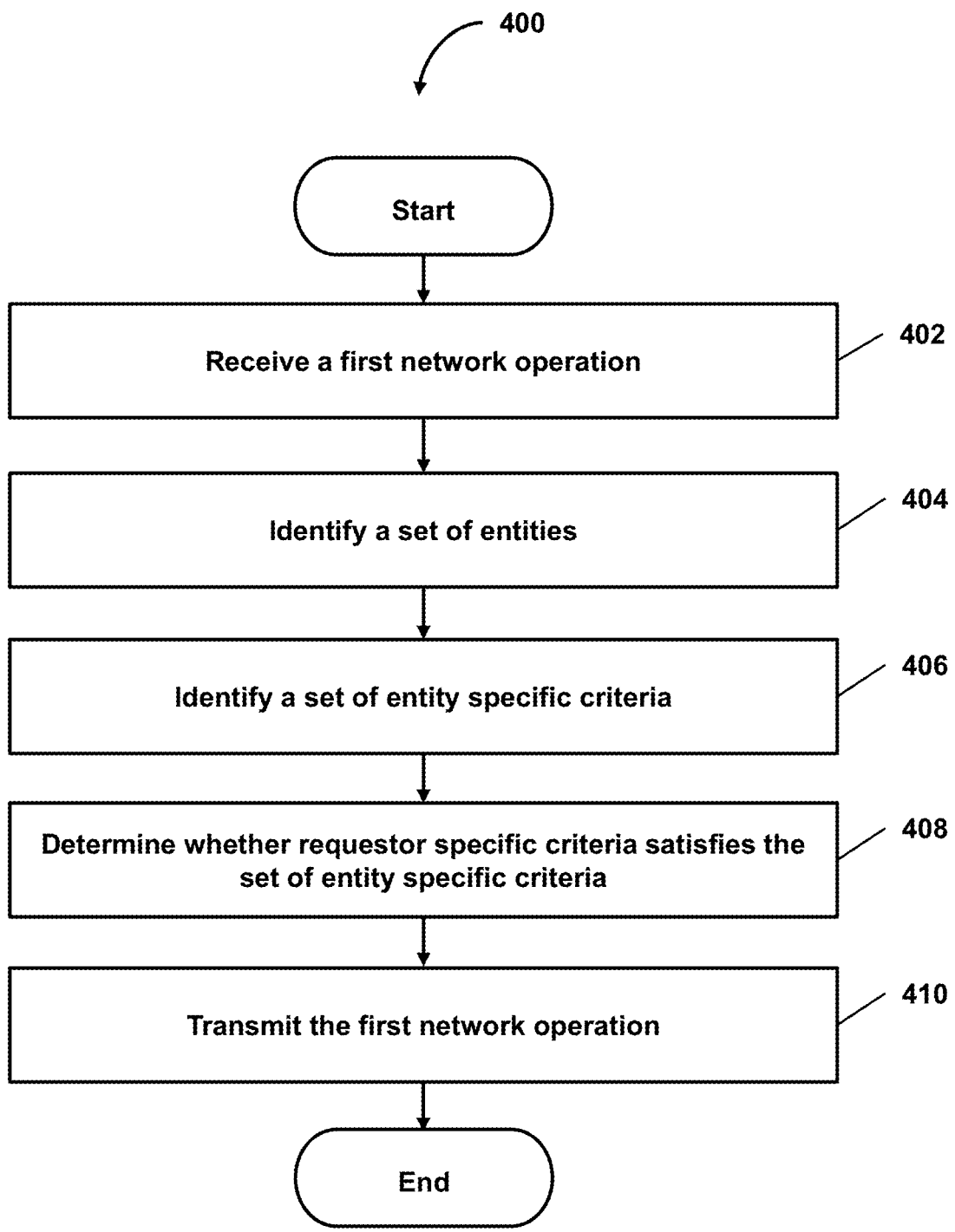
FIG. 4 is a flow diagram illustrating a process of reducing network traffic by filtering network requests based on network request-related information, in accordance with some implementations of the present technology.

FIG. 4 a flow diagram illustrating a process of reducing network traffic by filtering network requests based on network request-related information, in accordance with some implementations of the present technology.

At act 402, process 400 receives a first network operation. For example, process 400 receives, from a first remote computing system, a first network operation indicating (i) a request to access a first resource and (ii) a set of requestor specific criteria associated with accessing the first resource. The request to access a first resource can be a loan request (e.g., for a type of loan, such as a personal loan, mortgage loan, automotive loan, business line of credit loan, equipment financing loan, bridge loan, inventory financing loan, Small Business loan) and the set of requestor specific criteria can be criteria the a loan applicant provides in conjunction with the loan request. For instance, the loan applicant (e.g., the requestor) may indicate a loan amount, purpose of the loan, an indication as to whether the applicant wants to blacklist a lender/bank, length of time in business, a preferred geographic location of a lender/bank, or other loan request-related information.

Figure 5A:
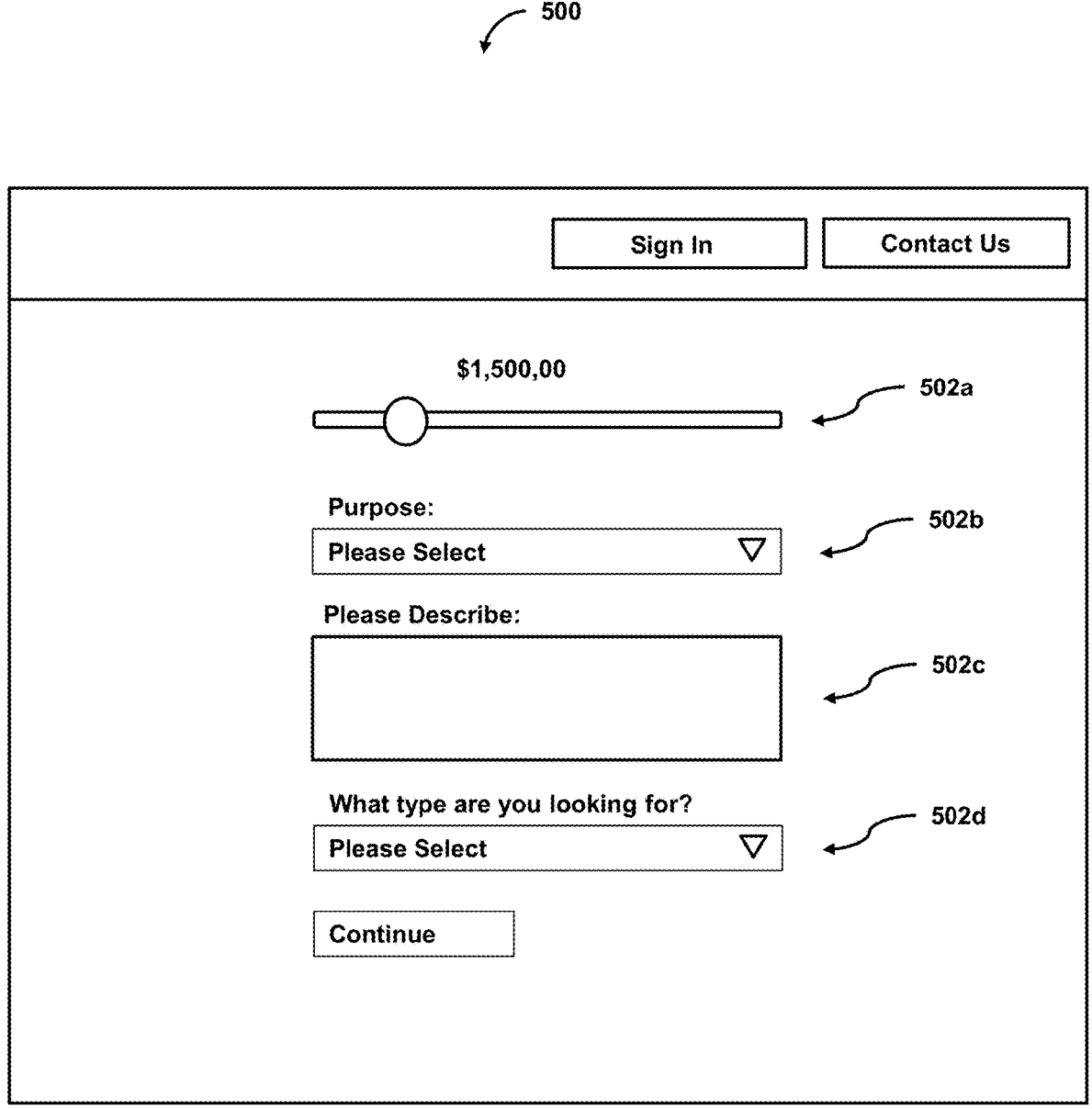

For example, referring to FIG. 5A, FIG. 5A shows an illustrative representation of a Graphical User Interface (GUI) 500. In some implementations, a requestor may indicate a set of requestor specific criteria 502a-502d. For example, the requestor can indicate, within GUI 500, a loan amount 502a, a loan purpose 502b, description of loan purpose 502c, a loan type 502d, or other requestor specific criteria. In some implementations, the requestor specific criteria can include requestor specific information indicating a requestor identifier (e.g., personally identifiable information of the loan applicant, a name of the loan applicant, a business name of the loan applicant, an address of the loan applicant, a social security number of the loan applicant), a credit score of the loan applicant, financial documentation of the loan applicant (e.g., W2's, revenue statements, net income statements, bank statements, industry performance documentation), or other information. For example, referring to FIG. 5B, the set of requestor specific criteria can also include revenue and net income indications 502e-502g, industry performance comments 502g, asset balance 502h, net worth balance 502i, outstanding order indicator 502j, or other requestor specific criteria. In this way, the system may receive a first network operation to properly vet the first network operation prior to directly transmitting the network operation to an intended recipient, thereby reducing the amount of network traffic experienced over computing networks when one or more errors may be present in the network operation.

The first remote computing system can be a client device to which the loan applicant interacts with to provide the first network operation. For example, the loan applicant may use computing device 102d to transmit the first network operation over network 104 to be received at server computing device 106 (FIG. 1). Thus, server computing device 106 (FIG. 1) receives the first network operation indicating the request to access the first resource and the set of requestor specific criteria. In some implementations, server computing device 106 may be the server that performs one or more processes as described herein, in accordance with one or more implementations of the present technology.

At act 404, process 400 identifies a set of entities. For example, process 400 identifies a set of entities associated with the first resource using the request to access the first resource, where each entity of the set of entities provides access to the first resource. To reduce the amount of network traffic conventionally associated with spamming multiple lenders with loan requests irrespective of (i) the type of loan or (ii) requestor specific criteria (e.g., requestor specific information pertaining to the loan), the system identifies a set of entities that may provide access to the given type of loan. As such, process 400 identifies a set of entities (e.g., lenders, banks, loan brokers, etc.) that may provide the loan. In this way, the system may filter out entities that do not provide the given resource (e.g., loan), thereby reducing the amount of network traffic experienced over one or more computing networks.

In some implementations, process 400 retrieves, from a database (e.g., database 108 (FIG. 1)), a set of entities. For instance, the set of entities may be all known possible lenders, banks, loan brokers, or other entities that provide loans. Process 400 can then determine, based on the first resource (e.g., as indicated in the first network operation), which entities of the set of entities provide the resource (e.g., the loan, the type of loan as indicated in the first network operation, etc.). For example, database 108 can store one or more data structures that indicate entity information such as (i) an entity, (ii) entity specific criteria of the entity, (iii) loans/loan types that the entity offers, or (iv) other entity-related information. Process 400n retrieves the entity information and determine which entities provide access to a given loan type (e.g., personal loan, mortgage loan, automotive loan, business line of credit loan, equipment financing loan, bridge loan, inventory financing loan, Small Business loan, or other loans). For instance, process 400 determines which entities provide access to the given loan type via a matching between the loan type indicated in the first network operation and the loan types offered in the entity information. Upon the matching, process 400 identifies, for each entity that provides the loan type as indicated in the network operation, the set of entities that provides access to first resource.

At act 406, process 400 identifies a set of entity specific criteria. For example, process 400 identifies a set of entity specific criteria for each entity of the set of entities associated with accessing the first resource. To selectively communicate with a filtered subset of entities, process 400 identifies the entity specific criteria of each entity of the set of entities to determine entity-specific information of the entity. Process 400 may obtain from a database (e.g., database 108 (FIG. 1)), the entity specific criteria of each entity of the set of entities (e.g., identified in act 404). For example, the entity specific criteria can include one or more preferences or inquiries that a given lender may have related to loan requests such as a minimum requirement for length of a loan applicant being in business, a minimum/maximum loan amount requirement (e.g., a threshold amount value), requirements for historical performance information (e.g., credit score, revenue, industry performance metrics), identity of the loan applicant requirements, loan type requirements, loan applicant location requirements, or other entity specific criteria. Such entity specific criteria is stored in the database (e.g., database 108 (FIG. 1)) for such retrieval or identification. For instance, process 400 can retrieve the entity specific criteria from the database by querying the database.

In some implementations, where the entity specific criteria is unknown, not currently stored, or outdated in the database, process 400 transmits a request to a remote computing system associated with the entity for the entity specific criteria. For example, where process 400 determines that there is no entity specific criteria for a given entity of the set of entities, process 400 can transmit a request for entity specific criteria over one or more computing networks to a remote computing device associated with the respective entity (e.g., via an IP address, URL, URI, etc.). As another example, process 400 can compare a current date (e.g., via one or more time keeping devices, via epoch time, or other time metric) to the date at which the entity specific criteria was stored in the database. Upon the comparison indicating that the difference between the current date and the date at which the entity specific criteria was stored in the database meeting or exceeding a threshold date value, process 400 transmits a request to a remote computing system associated with the respective entity (e.g., to which is associated with the outdated criteria) to obtain updated entity specific criteria. In this way, the system obtains the most up-to-date or missing entity specific criteria for use in selectively communicating with a filtered subset of entities of the set of entities.

At act 408, process 400 determines whether the set of requestor specific criteria satisfies the set of entity specific criteria. For example, process 400 determines, for each entity of the set of entities, whether the set of requestor specific criteria associated with accessing the first resource satisfies the set of entity specific criteria of a respective entity of the set of entities. For instance, to reduce the amount of network traffic experienced by one or more computing networks, the system determines whether the requestor specific criteria satisfies the entity specific criteria prior to transmitting the first network operation (e.g., the loan request) to a set of entities. That is, as opposed to existing systems that simply spams a large amount of lenders with a loan request, irrespective of whether (i) the loan request includes sufficient information, (ii) the loan request is likely to be accepted by a given lender, (iii) whether the loan request includes one or more errors, or (iv) whether the loan request will otherwise not conform or be in compliance with lender specific requirements, the system may ensure that the loan request is complete and is likely to be accepted by given lenders. In this way, the system reduces network traffic by checking that a loan request is complete and likely to be accepted by a lender, preventing ineligible loan requests to be transmitted over computing networks and a plethora of loan denials from such ineligible requests being returned over such computing networks.

In some implementations, process 400 identifies corresponding criteria between the set of requestor specific criteria and the entity specific criteria. As used herein, corresponding criteria may be criteria that is associated with a given criterion of the set of requestor specific criteria and a given criterion of the set of entity specific criteria of a respective entity. For example, the corresponding criteria may be matching criterion between the set of requestor specific criteria and the set of entity specific criteria. For instance, where the set of requestor specific criteria includes a loan amount, a preferred location of a lender, and a credit score, and the set of entity specific criteria for a given entity includes a loan amount/loan amount range, location(s) of the lender's office(s), and a minimum credit score requirement, process 400 determines that the loan amount corresponds to the minimum loan amount, the preferred location corresponds to location(s) of the lender's office(s), and the credit score corresponds to the minimum credit score requirement. Upon identifying the corresponding criteria between the set of requestor specific criteria and the set of entity specific criteria, process 400 can compare values associated with each of the corresponding criteria to determine whether the set of requestor specific criteria satisfies the set of entity specific criteria for a respective entity of the set of entities. In some implementations, each corresponding criterion may be satisfied based on a type of criterion. For instance, where the corresponding criterion is of a credit score/minimum credit score requirement, the credit score of the requestor may satisfy the minimum credit score requirement of the where the credit score of the requestor meets or exceeds the minimum credit score requirement of the entity (e.g., the lender). As another example, where the corresponding criterion is of a loan amount, the loan amount requested by the requestor may satisfy the loan amount/loan amount range of the entity where the loan amount of the requestor is at or within the loan amount range of the entity. Similarly, where the corresponding criteria involves a geographic location, business performance metrics, loan type, amount of time in business, or other criteria in accordance with one or more implementations of the present technology, the corresponding criteria may be satisfied when the requestor specific criteria (i) meets or exceeds, (ii) is at or within a given range, or (iii) fails to meet or exceed a respective criterion of the entity specific criteria. It should be noted, that one of skill in the art would appreciate differing variations of how the corresponding criteria may be satisfied, and that the examples presented above are exemplary for sake of brevity.

In some implementations, the set of requestor specific criteria satisfies the set of entity specific criteria when all corresponding criteria/criterion are satisfied. For example, continuing with the example above where the set of requestor specific criteria includes a loan amount, a preferred location of a lender, and a credit score, and the set of entity specific criteria for a given entity includes a loan amount/loan amount range, location(s) of the lender's office(s), and a minimum credit score requirement, when each corresponding criteria of the requestor specific criteria satisfies the corresponding criteria of the entity specific criteria, process 400 can determine that the set of requestor specific criteria satisfies the set of entity specific criteria. That is, when all three corresponding criteria are satisfied, process 400 can determine that the set of requestor specific criteria satisfies the set of entity specific criteria. In other implementations, however, where not all corresponding criteria are satisfied, process 400 can nonetheless determine that the set of requestor specific criteria satisfies the set of entity specific criteria for a respective entity of the set of entities. For instance, the set of requestor specific criteria may satisfy the set of entity specific criteria when a value of the set of requestor specific criteria satisfies a threshold value of entity specific criteria. Where the threshold value is a percentage, ratio, integer, or other value, the set of requestor specific criteria may satisfy the set of entity specific criteria when the value (e.g., a number of satisfied corresponding criterion) satisfies the threshold value of entity specific criteria. In some implementations the threshold value may be a predetermined threshold value stored in a database (e.g., database 108 (FIG. 1)).

In some implementations, the process 400 can dynamically request additional information from the user. For example, as a user is completing a loan application for a certain amount, the system may use a machine learning model to determine whether the answers to the questions would likely secure the loan (e.g., the set of requestor specific criteria). When the answers to the questions would not likely secure the loan for the specified amount, the system can generate additional questions for the user. For instance, the additional questions may be a request for a co-signer, additional collateral, industry performance documentation, etc. The process 400 can transmit the request for such additional information back to the user in real time to enable the user to update his/her answers. By obtaining the most accurate information in real time (or near real time), the system reduces network traffic experience by existing systems as insufficient loan requests are not transmitted over one or more computing networks to a large amount of lenders, only to deny the application.

For example, process 400 can determine whether the requestor specific criteria associated with accessing the first resource satisfies a second set of criteria related to accessing the first resource. For instance, the second set of criteria related to accessing the first resource can be entity specific criteria of a respective entity of the set of entities or historical criteria related to accessing the first resource (e.g., the loan request). The historical criteria related to accessing the first resource may be criteria that, historically, may be known to lead to an approval of a loan with respect to a loan request. To reduce the amount of network traffic, prior to transmitting the loan request to one or more lenders, process 400 determines whether the requestor specific criteria (e.g., the information associated with the loan request, such as the loan applicant's credit score, revenue, industry performance, length of time in business, etc.) is likely to lead to an approval of the loan request. As such, process 400 can apply a machine learning model using (i) the request to access the first resource and (ii) the set of requestor specific criteria to generate a prediction indicating whether the requestor specific criteria associated with accessing the first resource satisfies the second set of criteria related to accessing the first resource. As discussed above, the machine learning model may be trained on historical requests to access a resource, sets of requestor specific criteria, and second sets of criteria related to accessing the first resource to generate predictions indicating whether the requestor specific criteria associated with accessing the first resource satisfies the second set of criteria related to accessing the first resource.

In some implementations, in response to the prediction indicating that the requestor specific criteria associated with accessing the first resource fails to satisfy the second set of criteria, process 400 generates a response indicating a request for additional requestor specific criteria. For example, if the loan request does not include sufficient information that is historically known to lead to an approval of the loan (e.g., with respect to the requestor specific criteria currently associated/included in the loan request), process 400 can generate a request for additional requestor specific criteria to supplement the loan request with additional information. Alternatively, if the prediction indicating that the requestor specific criteria associated with accessing the first resource satisfies the second set of criteria, process 400 can transmit the first network operation to the respective entities of the set of entities (e.g., to which the requestor specific criteria satisfies the set of entity specific criteria or the second set of criteria).

The response (e.g., the request for additional requestor specific criteria) can include one or more inquires (e.g., questions) associated with the request to access the first resource. For example, the response may include one or more questions for the requestor to answer that is currently not included in the requestor specific criteria. As another example, the response may include a request for the requestor to supplement information currently included in the requestor specific criteria (e.g., prove your revenue by uploading one or more financial documents). Additionally, the inquiries may be tailored to the user based on the set of requestor specific criteria associated with the loan. To help with securing the loan, if the user specific information does not satisfy criteria associated with obtaining a loan for a given amount, the system may generate custom tailored questions to help with obtaining the loan, such as prior performance information, the need for the loan, the or other information.

Process 400 can transmit the request for the additional requestor specific criteria to the first remote computing system (e.g., the computing system associated with the requestor, an account associated with the requestor, etc.) to enable the requestor to provide the additional requestor specific criteria. In some implementations, upon the requestor providing the additional requestor specific information, process 400 can receive from the first remote computing system, an updated first network operation associated with the updated requestor specific criteria. For example, the updated first network operation may include the information of the original network operation (e.g., the loan request) and the additional requestor specific criteria.

For example, referring to FIG. 5c, a request for additional requestor specific criteria 504 is shown. The request for additional requestor specific criteria 504 may include one or more inquiries 506a-506e to enable the requestor to provide additional requestor specific criteria. As discussed above, the request for additional requestor specific criteria enables real-time (or near-real time) generation and reception of additional requestor specific criteria to be provided to process 400 when processing network operations (e.g., loan requests). As the request for additional requestor specific criteria 504, once completed by the requestor, can become part of the set of requestor specific criteria to update the first network operation (e.g., with the additionally provided requestor specific criteria), the system reduces the amount of unnecessary network traffic conventionally experienced via incomplete loan requests.

In some implementations, process 400 verifies an identity of the requestor. For example, process 400 can apply the machine learning model to generate a second prediction indicating whether the updated requestor specific criteria associated with accessing the first resource satisfies the second set of criteria related to accessing the first resource. For example, upon receiving the updated network operation including the updated requestor specific criteria, the system redetermines whether the updated information of the loan request will likely lead to an approval of the loan request. If the prediction indicates that the updated requestor specific criteria fails to satisfy the second set of criteria, process 400 transmits a request to a verify an identity of the requestor to a Know Your Customer (KYC) verification platform. Additionally or alternatively, if the prediction indicates that the updated requestor specific criteria satisfies the second set of criteria, process 400 can transmit the first network operation to a remote computing system associated with each entity of the set of entities (e.g., to which the entity specific criteria is satisfied).

As an example, process 400 applies the machine learning model to generate a second prediction indicating whether the updated requestor specific criteria associated with accessing the first resource satisfies the second set of criteria related to accessing the first resource using (i) the request to access the first resource and (ii) the updated requestor specific criteria. In response to the second prediction indicating that the updated requestor specific criteria fails to satisfy the second set of criteria, process 400 can transmit a request to verify an identify of the requestor associated with the first network operation to a KYC verification platform. For example, the KYC verification platform may be a platform that uses identifying information of a requestor (e.g., name, address, business address, Social Security Number, telephone number, email address, or other information included in the requestor specific criteria) to verify the identify of the requestor (e.g., loan applicant). For instance, the KYC verification platform may be Persona, Alloy, Trulioo, or other identity verification service providers/platforms. In some implementations, process 400 may receive, from the KYC verification platform, a KYC verification response indicating KYC response information such as a verification status of the requestor (e.g., verified, unverified, etc.), address verification, personally identifiable information verification, document verification (e.g., one or more financial documents provided by the requestor are verified as correct/true), or other verification-related information. Process 400 then generates a second updated first network operation associated with second updated requestor specific criteria using the KYC verification response. For example, the second updated first network operation may include the updated requestor specific criteria and the KYC verification response related information. In this way, the network operation is updated with the most up-to-date and reliable information, thereby not only increasing the chance that the requestor may be approved for the loan, but additionally reducing network traffic as the set of entities (e.g., the lenders) may not immediately issue an indication of a denial of the loan, thereby mitigating unnecessary network traffic.

In some implementations, process 400 determines whether the set of requestor specific criteria associated with accessing the first resource satisfies a condition associated with a second entity that is different from the respective entity. For example, when applying for a loan, proprietary information with respect to a given business that may be affected by whether the requestor is approved/denied for a loan may be known and stored in a database (e.g., database 108 (FIG. 1)). For instance, in the context of the requestor being a supplier for a given business, the outcome of whether the loan is approved or not can ultimately impact the business to whom the requestor supplies. The database may store information related to how important a given supplier (e.g., requestor) is to a business (e.g., second entity), and such information may aid in obtaining approval for a loan. Therefore, although process 400 may initially determine that the set of requestor specific criteria does not satisfy the set of entity specific criteria for a given entity (e.g., a lender), process 400 may determine whether the requestor specific criteria satisfies a condition associated with the second entity that is different the respective entity. If the requestor specific criteria satisfies the condition associated with the second entity, process 400 overrides the original failure to satisfy the entity specific criteria and enable the network operation to nonetheless be transmitted to the respective entity (e.g., the lender).

As such, process 400, in response to determining that the set of requestor specific criteria associated with accessing the first resource fails to satisfy the set of entity specific criteria of the respective entity, identifies a condition associated with a second entity that is different from the respective entity. For example, the condition may be a qualitative value, such as, "yes," "no," "high," "medium," "low," or other qualitative value indicating a level of importance that the requestor is to the second entity. As another example, the condition may be a quantitative value, such a percentage, decimal value, ratio, integer, or other quantitative value indicating a level of importance that the requestor is to the second entity. The second entity may be a company, merchant, or other business that is associated with the first network operation (e.g., the loan request). For example, the second entity may be a business to which the requestor intends to use funds to fulfil an order, supply the business, or otherwise utilize funds in connection with the business.

Process 400 determines whether the set of requestor specific criteria associated with accessing the first resource satisfies the condition associated with the second entity by obtaining the condition from the database (e.g., database 108 (FIG. 1)) and determine whether (i) a requestor identifier of the first network operation matches a requestor identifier associated with the condition and (ii) whether the requestor identifier satisfies the condition. As an example, where the requestor identifier indicates Company_A, the requestor identifier associated with the condition indicates Company_A, process 400 may determine whether the requestor identifiers match one another. Upon determining a match, process 400 determines whether the requestor identifier (e.g., Company_A) is an important requestor with respect to the second entity. For instance, the condition may indicate that Company_A is of "high" importance. As another example, the condition may indicate that Company_A is of 90% important to the second entity. Where the condition is of a quantitative value, such as 90% important/importance to the second entity, a threshold importance value may be compared to the condition to determine whether the requestor is of importance to the second entity. For instance, the threshold importance value may be a predetermined threshold importance value such as 70%, 75%, 80% or other predetermined threshold importance value (e.g., an integer, decimal, ratio, etc.). The condition may be satisfied when the condition meets or exceeds the threshold importance value.

In response to determining that the set of requestor specific criteria associated with accessing the first resource satisfies the condition associated with the second entity, process 400 determines that the set of requestor specific criteria associated with accessing the first resource satisfies the set of entity specific criteria of the respective entity. In this way, the system overrides the original failure to satisfy the entity specific criteria and enable the network operation to nonetheless be transmitted to the respective entity (e.g., the lender), thereby improving the user experience and aiding the likelihood of obtaining a loan approval.

In some implementations, process 400 determines whether the set of requestor specific criteria associated with accessing the first resource satisfies an access criteria associated with the first resource. For example, where the requestor is a supplier of a business, the process 400 determines whether the supplier has an outstanding order (e.g., to supply the business with one or more goods/services). Such information is advantageous when determining whether or not to transmit a network operation (e.g., a loan request) to an entity as when a requestor has an outstanding order, entities are more likely to provide a loan approval to the requestor. As such, process 400, in response to determining that the set of requestor specific criteria associated with accessing the first resource fails to satisfy the set of entity specific criteria of the respective entity, determines whether the set of requestor specific criteria associated with accessing the first resource satisfies an access criteria associated with the first resource. For example, the access criteria may be an indication as to whether there exists an outstanding order or need to supply a business. In some implementations, a database (e.g., database 108 (FIG. 1)) stores access criteria of a requestor. However, in other implementations, process 400 may perform web scraping to determine whether the requestor is associated with the access criteria. The set of requestor specific criteria associated with accessing the first resource may satisfy the access criteria when one or more criterion of the requestor specific criteria indicate that the requestor has an outstanding order to fulfil for a given business. For example, the requestor specific criteria may specify that the requestor has an outstanding order to be fulfilled. Process 400 then compares the requestor specific criteria (e.g., indicating that the requestor has an outstanding order) to the access criteria (e.g., the requirement of having an outstanding order), and upon a match, process 400 determines that the set of requestor specific criteria associated with accessing the first resource satisfies the access criteria. In response to determining that the set of requestor specific criteria associated with accessing the first resource satisfies the access criteria, process 400 determines that the set of requestor specific criteria associated with accessing the first resource satisfies the set of entity specific criteria of the respective entity. In this way, the system overrides the original failure to satisfy the entity specific criteria and enable the network operation to nonetheless be transmitted to the respective entity (e.g., the lender), thereby improving the user experience and aiding the likelihood of obtaining a loan approval. Moreover, as lenders are more apt to issue a loan approval when an outstanding order is present, the system mitigates unnecessary network traffic experienced by transmitting a loan denial, causing the requestor to reapply (or re-transmit) the network operation (e.g., loan request).

At act 410, process 400 transmits the first network operation. For example, process 400, in response to the set of requestor specific criteria associated with accessing the first resource satisfying the set of entity specific criteria of the respective entity, transmits the first network operation to a second remote computing system associated with the respective entity. As the set of requestor specific criteria (e.g., the loan request/loan application details) satisfies the set of entity specific criteria of the respective entity (e.g., the lender), process 400 transmits the loan request to lenders to which the loan application is complete and likely to result in a loan approval. For example, each entity of the set of entities may be associated with a remote computing system (e.g., a server, computing network, or other computing system) to which network requests and other information are able to be received at and transmitted from. For instance, a first entity may be associated with one remote computing system (e.g., server computing device 110a (FIG. 1)) and a second entity may be associated with another remote computing system (e.g., server computing device 110b (FIG. 1)). Process 400 may transmit the network operation to the respective entities via an IP address, URL, URI, or other address associated with the respective entities' computing system to enable the respective entities to process the network operation (e.g., loan request). In some implementations, in response to (i) the value associated with accessing the first resource satisfying the threshold value of the entity specific criteria (e.g., a loan amount) of a respective entity and (ii) the set of requestor specific criteria satisfying the other entity specific criteria, process 400 transmits the first network operation to the address associated with the respective entity. In this way, by transmitting the network operation to entities to which the set of requestor specific criteria satisfies the set of entity specific criteria (e.g., the filtered subset of the set of entities), the system selectively communicates with a subset of entities, thereby reducing the amount of network traffic experienced over one or more computing networks.

In some implementations, process 400 prevents a transmission of the first network operation to a given entity. For example, to reduce the amount of network traffic experienced over one or more computing networks, the system can identify whether a requestor blacklists a given entity from receiving the first network operation. In the context of applying for a loan, the requestor (e.g., loan applicant) may indicate that the requestor does not want to provide a loan application to a given lender. The requestor may be shopping for the best loan terms, and as such, may not want to notify an existing lender that the requestor is shopping around. As such, the requestor may specify in the set of requestor specific criteria, an indication to prevent transmission of the first network operation (e.g., the loan application/loan request) to one or more entities of the set of entities. In response to identifying the indication to prevent transmission of the first network operation to the given entity, process 400 prevents the transmission of the first network operation to the second remote computing system associated with the given entity, thereby reducing the amount of unnecessary network traffic experienced over one or more computing networks.

In some implementations, the process 400 receives a response. For example, subsequent to transmitting the network operation to the filtered subset of entities, process 400 can receive one or more responses from the remote computing systems associated with the respective entities of the filtered subset of entities. For instance, the response may indicate an authorization to access the first resource (e.g., a loan approval) and may also include one or more first resource details (e.g., loan term information).

For example, when the loan request has been transmitted to the subset of lenders, each lender may provide an indication as to whether the loan is approved or denied (e.g., whether the loan is authorized/unauthorized). Process 400 can obtain the response from each bank and provide each response to the loan applicant (e.g., the user) in an graphical user interface (GUI) to enable the requestor to view response related information (e.g., loan response information, such as loan term details). In some implementations, the user interface may enable the user to view each loan response in a side by side view to compare loan details information. In some implementations, the user interface may enable the user to filer loan responses based on indicated loan amounts, interest rates, maturity, or other information.

Figure 5D:
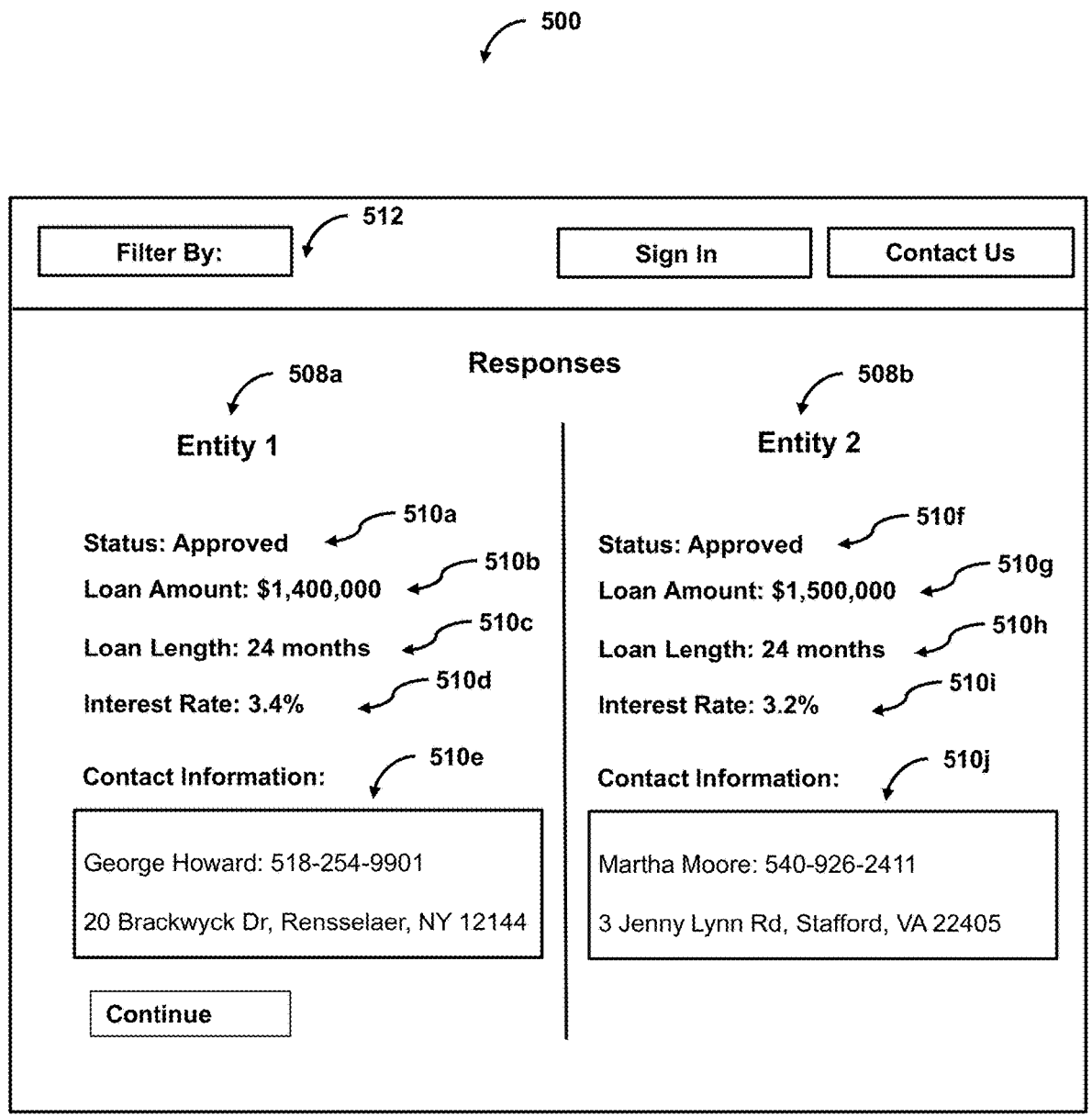

For example, referring to FIG. 5d, responses from respective entities are shown. For instance, each response, such as first response 508a and second response 508b, can include response related information 510. For instance, the first response related information may be loan term information such as first loan status 510a, first loan amount 510b, first loan length 510c, first interest rate 510d, or first contact information 510e. Second response related information may be loan term information such as second loan status 510f, second loan amount 510g, second loan length 510h, second interest rate 510i, or second contact information 510j. It should be noted, that other response related information may be included in the respective responses, and that such examples are shown for the sake of brevity. As another example, GUI 500 may also enable the requestor to view such responses in a filtered view using filter criteria 512. For instance, a requestor may filter all received responses by a given criteria, such as a loan amount, loan length, interest rate, lender location, or other loan term information. Additionally or alternatively, a requestor may filter such received responses in an ascending or descending order, with respect to loan term information to enable the requestor to easily compare and view loan offers, thereby improving the user experience.

In some implementations, process 400 prevents the transmitting of the first response to the first remote computing system. For example, where the response (e.g., as received from a given entity of the filtered subset of entities) indicates a denial of access to the first resource (e.g., the loan request is denied or otherwise unapproved), process 400 prevents the response from being transmitted to the first remote computing system (e.g., that of the requestor). For instance, process 400 may determine that a response (e.g., from at least one entity of the filtered subset of entities) indicates a denial of access to the first resource. Process 400 may perform Natural Language Processing on the response to determine whether contextual information of the response information indicates a denial of access to the first resource. Upon determining that the response indicates a denial of access to the first resource (e.g., an unapproved or denied loan), process 400 prevents transmission of the response to the requestor. In this way, the system reduces unnecessary network traffic by transmitting responses back to requestors (e.g., loan applicants) when loan requests are approved as opposed to denied, thereby improving the user experience.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method for reducing network traffic by filtering network requests based on network request-related information to be transmitted to one or more remote computing systems, the method comprising:
   receiving, from a first remote computing system, a first network operation indicating a request to access a first resource;
   identifying a set of entities associated with the first resource;
   selectively communicating with a filtered subset of entities of the set of entities by:
      identifying a set of entity specific criteria for each entity of the set of entities associated with accessing the first resource;
      in response to a set of requestor specific criteria associated with accessing the first resource failing to satisfy the set of entity specific criteria of a first entity, identifying a condition associated with a second entity that is different from the first entity, wherein it is determined that the set of requestor specific criteria associated with accessing the first resource fails to satisfy the set of entity specific criteria of the first entity; and
      in response to determining that the set of requestor specific criteria satisfies the condition associated with the second entity,
      transmitting the first network operation to a second remote computing system, wherein the set of requestor specific criteria satisfies the condition associated with the second entity;
   receiving, via a third remote computing system, a first response, wherein the first response comprises information from at least one entity of the filtered subset of entities indicating authorization to access the first resource;
   determining that the authorization to access the first resource indicates a denial of access to the first resource; and
   preventing a transmitting of the first response to the first remote computing system in response to the authorization to access the first resource indicating the denial of the access to the first resource, wherein the authorization to access the first resource indicates the denial of the access to the first resource.

2. The method of claim 1, further comprising:
   transmitting the first response to the first remote computing system to enable a requestor to view a graphical representation of first response related information of the first response.

3. The method of claim 1, further comprising:
   in response to at least one criterion of the set of requestor specific criteria associated with accessing the first resource failing to satisfy at least one criterion of the set of entity specific criteria of the first entity, receiving an updated first network operation comprising updated requestor specific criteria, wherein the updated first network operation is received in response to transmitting a request for additional requestor specific criteria to the first remote computing system, and wherein the at least one criterion of the set of requestor specific criteria associated with accessing the first resource fails to satisfy the at least one criterion of the set of entity specific criteria of the first entity.

4. The method of claim 3, wherein the response indicating the request for the additional requestor specific criteria comprises one or more inquiries associated with the request to access the first resource.

5. The method of claim 3, further comprising:
   in response to determining that at least one criterion of the set of updated requestor specific criteria fails to satisfy at least one criterion of the set of entity specific criteria of the first entity, receiving a second updated first network operation associated with second updated requestor specific criteria in response to a verification platform providing an indication of an identity of a requestor associated with the first network operation, wherein the at least one criterion of the set of updated requestor specific criteria failing to satisfy the at least one criterion of the entity specific criteria is determined.

6. A method for reducing network traffic by filtering network requests based on network request-related information to be transmitted to one or more remote computing systems, the method comprising:
   receiving, from a first remote computing system, a first network operation indicating a request to access a first resource;
   identifying a set of entities associated with the first resource;
   selectively communicating with a filtered subset of entities of the set of entities by:
      responsive to determining that requestor specific information associated with the request to access the first resource fails to satisfy a set of criteria related to a value associated with accessing the first resource, receiving an updated first network operation comprising updated requestor specific information;

identifying a set of entity specific criteria for each entity of the set of entities, wherein the entity specific criteria comprises (i) a threshold value associated with accessing the first resource and (ii) other entity specific criteria;

in response to (i) the value associated with accessing the first resource satisfying the threshold value of the entity specific criteria of the respective entity and (ii) the updated set of requestor criteria of the updated first network operation satisfying the other entity specific criteria, transmitting the updated first network operation to a second remote computing system associated with the respective entity, wherein the value associated with accessing the first resource satisfies the threshold value of the entity specific criteria of the respective entity, and wherein the updates set of requestor specific criteria of the updated first network operation satisfies the other entity specific criteria; and in response to determining that at least one criterion of the set of updated requestor specific criteria fails to satisfy at least one criterion of the set of entity specific criteria of the first entity, receiving a second updated first network operation associated with second updated requestor specific criteria in response to a verification platform providing an indication of an identity of a requestor associated with the first network operation, wherein the at least one criterion of the set of updated requestor specific criteria failing to satisfy the at least one criterion of the entity specific criteria is determined.

7. The method of claim 6, further comprising:

receiving, via a third remote computing system, a first response, wherein the first response comprises information from at least one entity of the filtered subset of entities indicating authorization to access the first resource; and transmitting the first response to the first remote computing system to enable the requestor to view a graphical representation of first response related information of the first response.

8. The method of claim 6, further comprising:

receiving, via a third remote computing system, a first response, wherein the first response comprises information from at least one entity of the filtered subset of entities indicating authorization to access the first resource;

determining whether the authorization to access the first resource indicates a denial of access to the first resource; and preventing a transmitting of the first response to the first remote computing system in response to the authorization to access the first resource indicating the denial of the access to the first resource, wherein the authorization to access the first resource indicates the denial of the access to the first resource.

9. The method of claim 6, further comprising:

generating a request for the updated requestor specific information;

transmitting the request for the updated requestor specific information to the first remote computing system; and in response to transmitting the request for the updated requestor specific information, receiving the updated first network operation comprising the updated requestor specific information, wherein the request for the updated requestor specific information is transmitted.

10. A non-transitory computer readable medium comprising instructions that, when executed by at least one processor, cause operations comprising:

receiving, from a first remote computing system, a first network operation indicating a request to access a first resource;

identifying a set of entities associated with the first resource;

selectively communicating with a filtered subset of entities of the set of entities by:

responsive to determining that at least one criterion of a set of requestor specific criteria fails to satisfy the at least one criterion of the first set of criteria related to accessing the first resource using the first network operation, receiving an updated first network operation comprising updated requestor specific criteria;

responsive to determining that at least one criterion of the updated requestor specific criteria fails to satisfy the at least one criterion of the entity specific criteria, generating a second updated first network operation associated with second updated requestor specific criteria in response to a verification platform providing an indication of an identity of a requestor associated with the first network operation;

determining, for each entity of the set of entities, that an updated set of requestor specific criteria of the second updated first network operation satisfies a set of entity specific criteria of a respective entity of the set of entities; and in response to the updated set of requestor specific criteria of the second updated first network operation satisfying the set of entity specific criteria of the respective entity, transmitting the second updated first network operation to a second remote computing system associated with the respective entity.

11. The medium of claim 10, wherein the operations further comprise:

receiving, via a third remote computing system, a first response, wherein the first response comprises information from at least one entity of the filtered subset of entities indicating authorization to access the first resource; and transmitting the first response to the first remote computing system to enable the requestor to view a graphical representation of first response related information of the first response.

12. The medium of claim 10, wherein the operations further comprise:

receiving, via a third remote computing system, a first response, wherein the first response comprises information from at least one entity of the filtered subset of entities indicating authorization to access the first resource;

determining that the authorization to access the first resource indicates a denial of access to the first resource; and preventing a transmitting of the first response to the first remote computing system in response to the authorization to access the first resource indicating the denial of the access to the first resource.

13. The medium of claim 10, wherein the verification platform is a KYC verification platform.

14. The medium of claim 10, wherein the response indicating the request for additional requestor specific criteria comprises one or more inquiries associated with the request to access the first resource.

15. The medium of claim 10, wherein the operations further comprise:
    generating the request for the updated first network operation; and
    transmitting the request for the updated first network operation to the first remote computing system.

16. The medium of claim 10, wherein the operations further comprise:
    determining that the updated set of requestor specific criteria of the second updated first network operation fails to satisfy the set of entity specific criteria of the respective entity;
    in response to the updated set of requestor specific criteria of the second updated first network operation failing to satisfy the set of entity specific criteria of the respective entity, identifying a condition associated with a second entity that is different from the respective entity;
    determining that the updated set of requestor specific criteria of the second updated first network operation satisfies the condition associated with the second entity; and
    in response to determining that the updated set of requestor specific criteria of the second updated first network operation satisfies the condition associated with the second entity, determining that the updated set of requestor specific criteria of the second updated first network operation satisfies the set of entity specific criteria of the respective entity.

17. The medium of claim 10, wherein the operations further comprise:
    determining that the updated set of requestor specific criteria of the second updated first network operation fails to satisfy the set of entity specific criteria of the respective entity;
    in response to the updated set of requestor specific criteria of the second updated first network operation failing to satisfy the set of entity specific criteria of the respective entity, determining that the updated set of requestor specific criteria of the second updated first network operation satisfies an access criteria associated with the first resource; and
    in response to determining the updated set of requestor specific criteria of the second updated first network operation satisfies the access criteria, determining that the updated set of requestor specific criteria of the second updated first network operation satisfies the set of entity specific criteria of the respective entity.

18. The medium of claim 10, wherein the operations further comprise:
    identifying, from the set of requestor specific criteria, an indication to prevent transmission of the first network operation to a given entity of the set of entities; and
    in response to identifying the indication to prevent transmission of the first network operation to the given entity, preventing the transmission of the first network operation to the second remote computing system associated with the given entity.

* * * * *